US012560923B2

(12) United States Patent     (10) Patent No.: US 12,560,923 B2
Kalidindi                          (45) Date of Patent:     Feb. 24, 2026

(54) AUTOMATED SELF-PRECISION VALIDATION ACCELEROMETER AND SYSTEM FOR MACHINE DIAGNOSIS

(71) Applicant: Rahul Varma Kalidindi, Visakhapatnam (IN)

(72) Inventor: Rahul Varma Kalidindi, Visakhapatnam (IN)

( * ) Notice: Subject to any disclaimer, the term of this patent is extended or adjusted under 35 U.S.C. 154(b) by 475 days.

(21) Appl. No.: 18/248,692

(22) PCT Filed: Feb. 4, 2021

(86) PCT No.: PCT/IN2021/050113
§ 371 (c)(1),
(2) Date: Apr. 12, 2023

(87) PCT Pub. No.: WO2022/079727
PCT Pub. Date: Apr. 21, 2022

(65) Prior Publication Data
US 2023/0384779 A1     Nov. 30, 2023

(30) Foreign Application Priority Data

Oct. 13, 2020     (IN) ............................. 202041044448

(51) Int. Cl.
*G05B 23/02*          (2006.01)
(52) U.S. Cl.
CPC ..... *G05B 23/0221* (2013.01); *G05B 23/0272* (2013.01)
(58) Field of Classification Search
CPC ........................ G05B 23/0221; G05B 23/0272; G05B 23/02; G01H 1/003
See application file for complete search history.

(56) References Cited

U.S. PATENT DOCUMENTS 6,840,106 B1 *   1/2005   McNeil ................. G01P 15/125
                                                      73/514.32
7,152,474 B2 *  12/2006   Deb ...................... B81C 99/005
                                                      73/514.32
(Continued)

FOREIGN PATENT DOCUMENTS

IN      201721003774 A      2/2017
WO        2020128685 A1     6/2020

OTHER PUBLICATIONS

Agoston Katalin, "Fault Detection with Vibration Transducers", Procedia Technology, Dec. 31, 2014, pp. 119-124, vol. 12.

(Continued)

*Primary Examiner* — Manuel A Rivera Vargas
(74) *Attorney, Agent, or Firm* — Novel Patent Services LLC

(57)          ABSTRACT
An automated self-precision validation accelerometer is configured for machine diagnosis for efficient and accurate vibration readings from the machine. The accelerometer sensor system conducts self-precision validation test and diagnosis. The accelerometer sensor system comprises two accelerometer sensors for more data acquisition. The usage of two tri-axial accelerometers identify ill-health of the sensors through a self-precision validation test conducted by a firmware module configured in the microcontroller unit that triggers the accelerometers to conduct in built self-test at specific constraints. The system 300 for self-precision validation accelerometer sensor comprises a power supply unit 301, a self-test sensor assembly 302, a wireless interface unit 303, and an external device 304. The firmware module 302c further sends a report on the test to the external device 304 through a wireless interface unit 303 advising for the replacement of sensor.

10 Claims, 5 Drawing Sheets

(56)         References Cited

U.S. PATENT DOCUMENTS

| | | | | |
|---|---|---|---|---|
| 10,607,424 | B2 * | 3/2020 | Batcheller | B64D 45/00 |
| 2005/0183489 | A1 * | 8/2005 | Weinberg | G01D 3/08 |
| | | | | 73/1.01 |
| 2009/0043405 | A1 * | 2/2009 | Chester | G05B 23/0254 |
| | | | | 700/51 |
| 2020/0408805 | A1 * | 12/2020 | Hu | G01P 15/18 |

OTHER PUBLICATIONS

ABB Review, "Transforming Condition Monitoring of Rotating Machines", Online, Jun. 17, 2019.

* cited by examiner

AUTOMATED SELF-PRECISION VALIDATION ACCELEROMETER AND SYSTEM FOR MACHINE DIAGNOSIS

FIELD OF THE INVENTION

The present invention relates to the technical field of tri-axial accelerometer sensors used for machine diagnosis, and in specific relates to an accelerometer sensor assembly and a system and method for an automated self-precision validation that initiates the sensor assembly to conduct in built self-test as and when required.

BACKGROUND OF THE INVENTION

Many types of machines are used in a production or manufacturing facility, such as in the production of consumer and industrial goods and in the delivery of basic utility services. Because of the importance of these machines in meeting production and service requirements, taking a machine offline unexpectedly due to a failure can be costly. If a deteriorating condition is not detected, a failure may occur. Examples of such machines for which it is desirable to collect data for preventive maintenance are motors, pumps, generators, compressors, lathes and other machines having rotating or other moving parts, such as a shaft, rotor, or bearings.

In some applications, machine failures may also pose a significant safety hazard. Thus, early detection of impending failure is highly desirable, such that the machine can be maintained or repaired in a pro-active manner before a catastrophic failure occurs, rather than repairing reactively after a costly failure has already occurred. Many problems such as bearing degradation, gear failures, imbalances, etc. which may eventually lead to an expensive failure can be diagnosed prior to failure by monitoring the vibration of the machine at one or more points. Therefore, it is desirable to instrument high-value or safety-critical machines with vibration sensors which can be monitored periodically to judge the health of the machine and help inform maintenance activities.

A Tri-axial accelerometer is generally used to collect tri-axial vibration data from a vibrating body or surface. Once the accelerometer is installed on the vibrating body, it starts sending data at intervals as per the program commands. If there are any deviations present in the sensor values from the actual values, then there exists inaccuracy in the readings provided by the accelerometer which is not easily detectable. For tri-axial accelerometer, acceleration sensing is done in each of three axles (Z-axis, transverse axis, the longitudinal axis), and if any misalignments present, then the accuracy of reading gets influenced.

Another shortcoming is data collection methods where technician errors can occur in identifying a machine or test point, or in installing components for setting up data collection at a test point. Although instructions may be provided to the technician, the technician still may misidentify a test point, or orient or otherwise position a sensor inaccurately at a given test point.

Further, tri-axial accelerometer devices are mounted within housing assemblies. As some tri-axial accelerometer devices are designed to provide precise measurements, the mounting within the housing assemblies are designed to precise tolerances to increase the accuracy of the measurements. Due to these precise tolerances, the housing assemblies and tri-axial accelerometer devices can be difficult to design and manufacture.

Hence, there always exists an element of doubt about the accuracy of the readings provided by single tri-axial accelerometer. Due to any reason if the sensor values have some deviation from the actual vibration values, they are not detectable since no other means are known to detect the actual vibration values. There is no automatic notifying means to take necessary step when an abnormality occurs in the sensor readings.

Even though an inbuilt self-test mechanism is available in a tri-axial accelerometer, since we don't know the actual vibration data of the vibrating surface, a need to frequently check the health of the tri-axial accelerometer exists to ensure that the vibration data collected and provided by the sensor is reliable. To avoid frequent health checks and also to avoid dependency on only one tri-axial accelerometer, a procedure should be designed.

Therefore, an error free and precise accelerometer device for detecting defects in rotating or reciprocating machines is needed. An accelerometer sensor assembly is required that provides a more accurate and reliable data acquisition. A self-precision validation test procedure is needed that initiates the accelerometer in built self-test as and when required.

A self-precision validation test procedure is needed that automatically processes and analyzes the sensor data to find any abnormal readings present. A device that analyzes and automatically sends the sensor health data to the external device for further action is needed. The sensor assembly is needed in such a way that safeguards the components while meeting the precise requirements.

Objectives of the Invention

The primary objective of the invention is to provide an automated self-precision validation accelerometer sensor device and a system that provides precise vibration readings for detecting defects in rotating or reciprocating machines.

The other objective of the invention is to design a tri-axial accelerometer sensor assembly that provides an accurate, error-free, efficient and reliable vibration data.

The other objective of the invention is to utilize two tri-axial accelerometers instead of one for more accurate and reliable data acquisition.

The other objective of the invention is to conduct an automated self-precision validation test procedure of tri-axial accelerometers that triggers the accelerometers to conduct in built self-test as and when required.

The other objective of the invention is to ensure less number of self-tests to be conducted which can also be further configurable to conduct at predefined time intervals.

Another objective of the invention is to conduct the in built self-test of the tri-axial accelerometer sensor either at predefined regular intervals or whenever the difference in the RMS values calculated by using the data from the pair of tri-axial accelerometers is more than a minimum allowable percentage.

Further other objective of the invention is to wirelessly send the sensor health data to the external device for further action to be taken.

Yet another objective of the invention is to configure the accelerometer sensor system by utilizing a closed magnetic circuit for better fixing and further safeguarding the electronic components from the magnetic field.

SUMMARY OF THE INVENTION

The present disclosure proposes an automated self-precision validation accelerometer and system for machine diagnosis. The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

According to an aspect of the invention, an automated system for self-precision validation accelerometer sensor is proposed. The system comprises a self-test sensor assembly and a wireless interface unit. The self-test sensor assembly is configured for accommodating various components to conduct self-precision validation test and machine diagnosis and the components further comprise a pair of tri-axial accelerometers, a pair of magnets, a microcontroller board, a sensor casing, and a metallic cup holder.

The pair of tri-axial accelerometers is configured to detect vibration data from the machine and conduct in built self-test with more accurate and reliable data acquisition. The pair of magnets is arranged with their poles in reverse for better fixing of the sensor assembly. The microcontroller board is accommodated with the pair of tri-axial accelerometers. An acrylic sheet is arranged to hold the microcontroller board.

The microcontroller board is configured with a firmware module that collects and processes vibration data from the pair of tri-axial accelerometers, automatically conducts a self-precision validation test of the two tri-axial accelerometers to check their health status by initiating the in built self-test in the two tri-axial accelerometers at specific constraints, generates a self-test report and thereby transmits an output signal on health status of the accelerometers based on the report. The self-precision validation test is automatically conducted by the firmware module that initiates the accelerometers to conduct in built self-test at specific constraints that include regular predefined intervals and whenever the difference in the RMS values from the two accelerometers is more than a minimum allowable percentage. The regular predefined intervals say once in 60 minutes, and wherein the minimum allowable percentage, say 10%. The output signal from the microcontroller includes specific codes provided by the firmware module which further include healthy status of the tri-axial accelerometers and suggestion to replace the defective sensor.

The sensor casing is configured to accommodate the pair of magnets and the microcontroller board along with a metal plate behind the pair of magnets. The sensor casing is affixed with a rubber gland to route cables which holds power and communication wires. The metallic cup holder is configured for holding the sensor casing on the machine or any vibrating surface and forming a closed magnet circuit along with the metal plate behind the pair of magnets for better fixing of the sensor assembly and safeguarding the electronic components from getting influenced by the magnetic field. The arrangement of reversing the polarity of the pair of magnets, usage of the metal plate and the metallic cup holder restricts total magnetic field provided by the two magnets from influencing all sensitive electronic components of the sensor assembly. The metallic cup holder is attached on the machine or any vibrating surface with the help of either glue or welding to prevent the sensor assembly from sliding.

The wireless interface unit is configured to transmit the output signal from the microcontroller to an external device for further analysis. The system further comprises a power supply unit that includes an AC/DC converter and a DC/DC converter. The system utilizes RC filters to process the analog vibration data for limiting the bandwidth. Thus, the automated system with the self-precision validation test identifies ill-health or malfunctioning of the sensor device as and when required and allows for accurate and reliable data acquisition.

According to another exemplary embodiment of the invention, a self-precision validation test procedure of the tri-axial accelerometers performed by the firmware module is disclosed. The method comprises first step of collecting and processing vibration data from a first tri-axial accelerometer and a second tri-axial accelerometer. Next, an RMS value and an FFT value is calculated for each accelerometer separately from the processed vibration data.

Later, a difference value is calculated from the RMS values of the first tri-axial accelerometer and the second tri-axial accelerometer. If the calculated RMS difference value obtained is less than a set limit, then an average of RMS values and an average of FFT values of the two tri-axial accelerometers are calculated. Further, the average values of RMS and FFT analysis of the two tri-axial accelerometers are sent to an external device through a wireless interface for further analysis.

In a variant, the two tri-axial accelerometers are initiated to conduct in built self-test either at regular predefined intervals or if the calculated RMS difference value of the first tri-axial accelerometer and the second tri-axial accelerometer is greater than the set limit. The self-test report is generated. The health status of the accelerometers is sent to the external device if both the tri-axial accelerometers are in good condition and average values of RMS and FFT analysis are continued to be sent to the external device.

In other case, indication of defective accelerometer is sent to the external device and recommended to replace it if one of the tri-axial accelerometer is found defective and other in good condition. Here, the RMS value and FFT value is collected and continued to send from the healthy tri-axial accelerometer. In further case, indication of defective functioning of both the accelerometers is sent to the external device if both the tri-axial accelerometers are found defective and recommended to replace the accelerometers immediately.

Further, objects and advantages of the present invention will be apparent from a study of the following portion of the specification, the claims, and the attached drawings.

DETAILED DESCRIPTION OF DRAWINGS

The accompanying drawings, which are incorporated in and constitute a part of the specification, illustrate an embodiment of the invention, and, together with the description, explain the principles of the invention.

DETAILED INVENTION DISCLOSURE

Figure 1A:
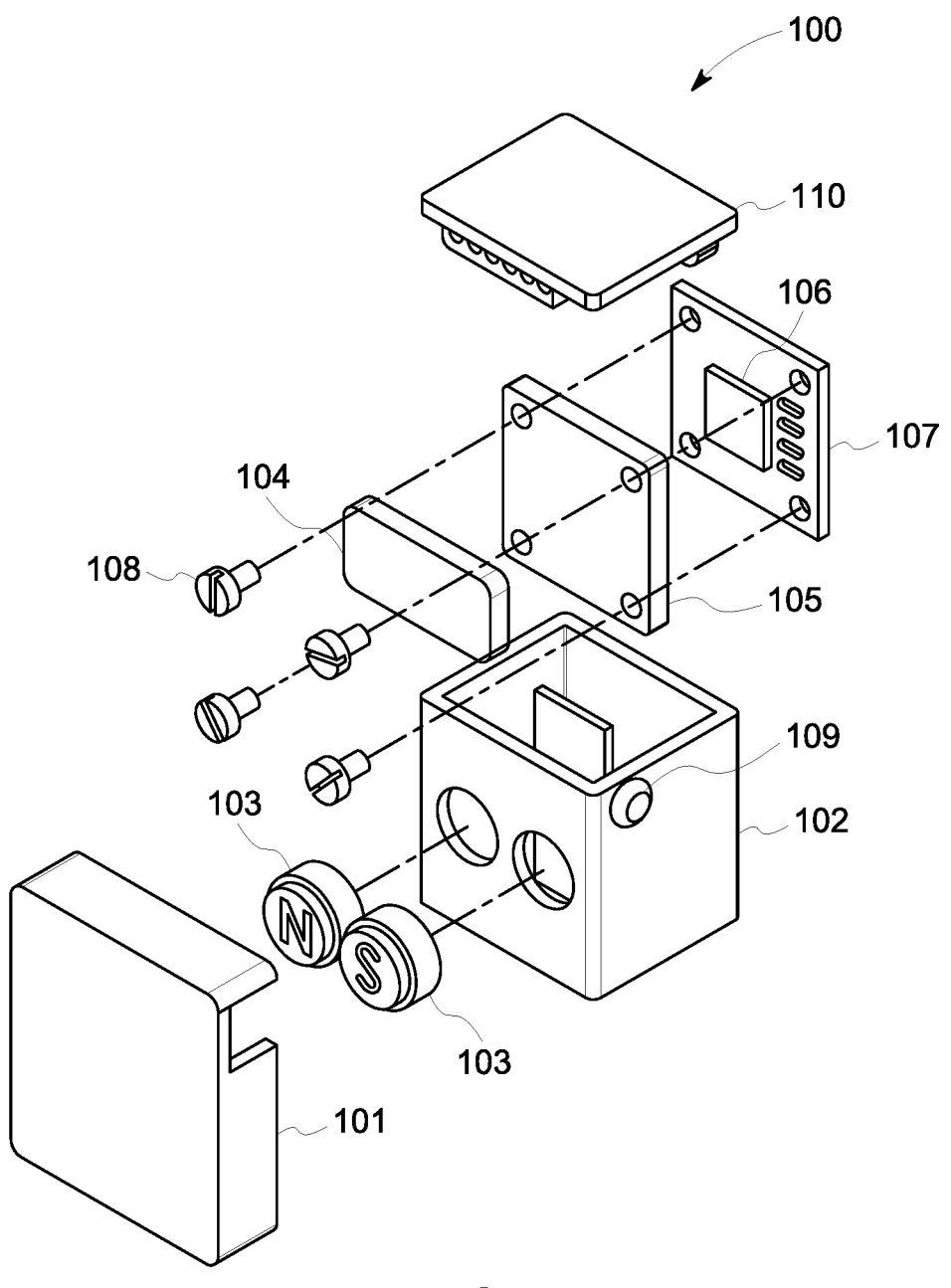
FIG. 1a depicts an exploded view of a self-test tri-axial accelerometer sensor, in accordance with an exemplary embodiment of the invention.

Various embodiments of the present invention will be described in reference to the accompanying drawings. Wherever possible, same or similar reference numerals are used in the drawings and the description to refer to the same or like parts or steps.

In-built self-test is a technique used in electronics to assess whether the electronic equipment operates according to its specification, or whether its operation is deviating from what is expected. If the operation deviation is identified, then it may indicate a problem with the equipment which may need to be addressed by fixing or replacing the equipment. A benefit of self-test is that it can be performed after the electronic equipment has been installed and/or deployed, after manufacture and out of the manufacturer's control, and possibly, without even having to disrupt its normal operations.

In a preferred exemplary embodiment of the invention, FIG. 1*a* is an exploded view of a self-test tri-axial accelerometer sensor 100. The sensor 100 assembly accommodates various components to conduct self-precision validation test and machine diagnosis. The components include a metallic cup holder 101 on which a sensor casing 102 is placed. A pair of magnets 103 are arranged in the sensor casing 102 such that their poles are reverse in order.

A metal plate 104 is placed behind the magnets 103. A microcontroller board 107 is accommodated with a pair of tri-axial accelerometers 106. An acrylic sheet 105 is arranged to hold the microcontroller board 107. A plurality of fixing members 108 which are fixing bolts used to fix the components of the sensor assembly 100. A rubber gland 109 is affixed to the sensor casing 102 to route cables which holds power and communication wires. A top cover 110 is placed over the sensor casing 102 to thereby cover the components incorporated in the casing. The sensor casing 102 is therefore configured to accommodate the pair of magnets 103, the metal plate 104, the acrylic sheet 105, the pair of tri-axial accelerometers 106, and the microcontroller board 107.

The metal plate 104 and the metallic cup holder 101 are designed to help and provide a closed loop for the strong magnetic field induced by the two magnets 103 to thereby provide a strong binding of the sensor housing with the metallic cup holder 101 and also to safe guard the electronic components from getting influenced by the magnetic field. The metallic cup holder 101 is configured for holding the sensor casing 102 and attached to the machine or any vibrating surface with the help of either glue or welding to prevent the sensor assembly from sliding.

The tri-axial accelerometers 106 are configured to detect vibration data from the machine with more accurate and reliable data acquisition. The accelerometer sensor is configured for machine diagnosis which means data obtained by inspection of a machine using a sensing device. The machine used herein includes a motor, pump, generator, compressor, or lathe, having moving parts, such as a shaft, rotor, or bearings.

The microcontroller board 107 is configured with a firmware module that collects and processes vibration data from the pair of tri-axial accelerometers 106, and automatically conducts a self-precision validation test of the two tri-axial accelerometers 106 to check the health status of the accelerometers more precisely. The self-precision validation test is automatically conducted by the firmware module which triggers the pair of tri-axial accelerometers 106 to conduct in built self-test. The self-test is conducted either at regular predefined intervals or if the difference in the RMS values calculated by using the data from the pair of tri-axial accelerometers is beyond the permissible limit.

The regular predefined intervals may include once in 60 minutes, and the permissible limit is whenever the difference in the RMS values calculated by using the data from the pair of tri-axial accelerometers is more than a minimum allowable percentage, which may be, 10%.

After conducting the self-precision validation test, the firmware module generates a self-test report and notifies it to the maintenance in-charge by transmitting an output signal to the external device. The output signal from the microcontroller includes specific codes provided by the firmware module which further include healthy status of the tri-axial accelerometers and suggestion to replace the sensor.

Figure 1B:
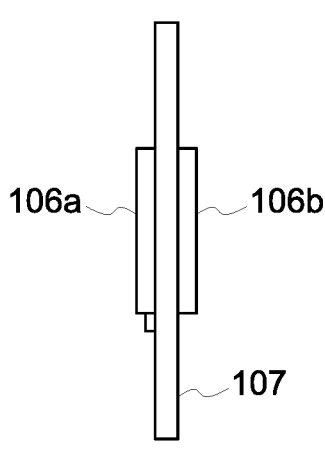
FIG. 1b depicts two tri-axial accelerometers fixed to microcontroller board, in accordance with an exemplary embodiment of the invention.

In another preferred exemplary embodiment of the invention, FIG. 1*b* is a detailed view of illustration of accelerometers arrangement of the self-test tri-axial accelerometer sensor 100. The pair of tri-axial accelerometers 106 includes a first accelerometer 106*a* and a second accelerometer 106*b*. The accelerometers 106*a* and 106*b* are fixed on either side of the microcontroller board 107. The self-precision validation test of both the accelerometers 106*a* and 106*b* are conducted.

Figure 2:
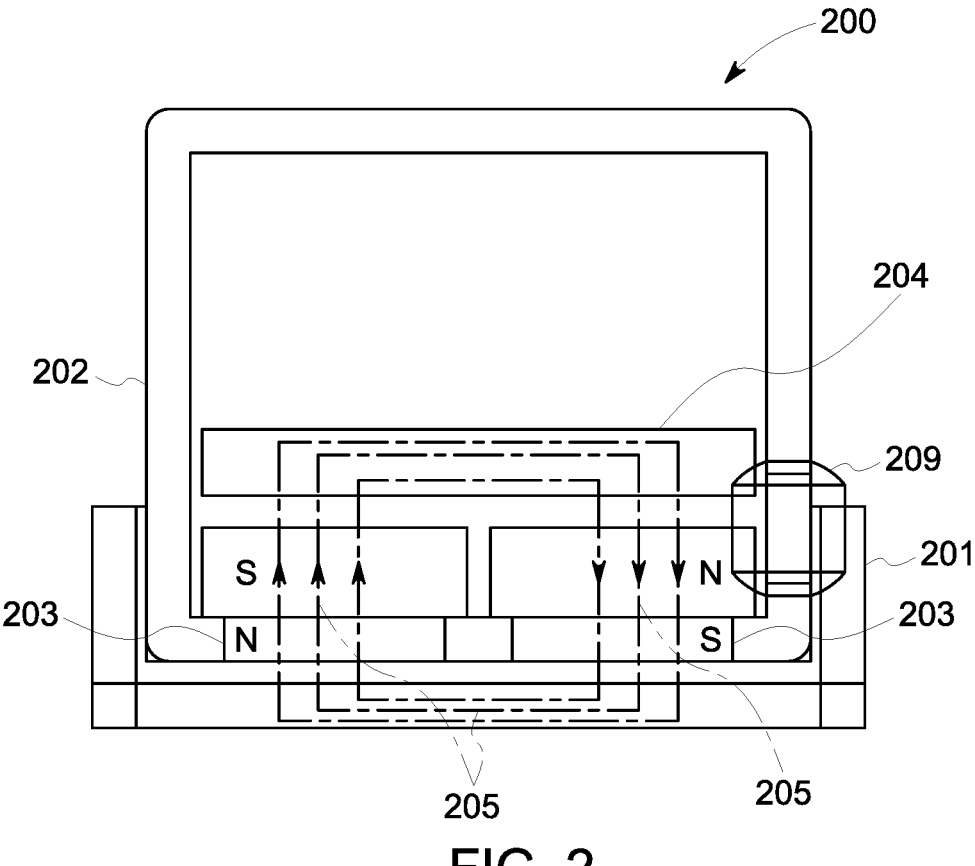
FIG. 2 depicts a sectional view of the self-test tri-axial accelerometer sensor fixed to the metallic cup holder, in accordance with an exemplary embodiment of the invention.

In other exemplary embodiment of the invention, FIG. 2 depicts a sectional view 200 of the self-test tri-axial accelerometer sensor fixed to the metallic cup holder. The figure indicates the arrangement of the two magnets 203 with their poles in reverse in the sensor casing 202. The magnetic field 205 is indicated within the closed loop formed between the metal plate 204 and the metallic cup holder 201. The arrangement of reversing the polarity of the pair of magnets 203, usage of the metal plate 204 and the metallic cup holder 201 restrict total magnetic field 205 provided by the two magnets 203 from influencing all the sensitive electronic components of the sensor assembly. The rubber gland 209 indicated is to route the cables.

Figure 3:
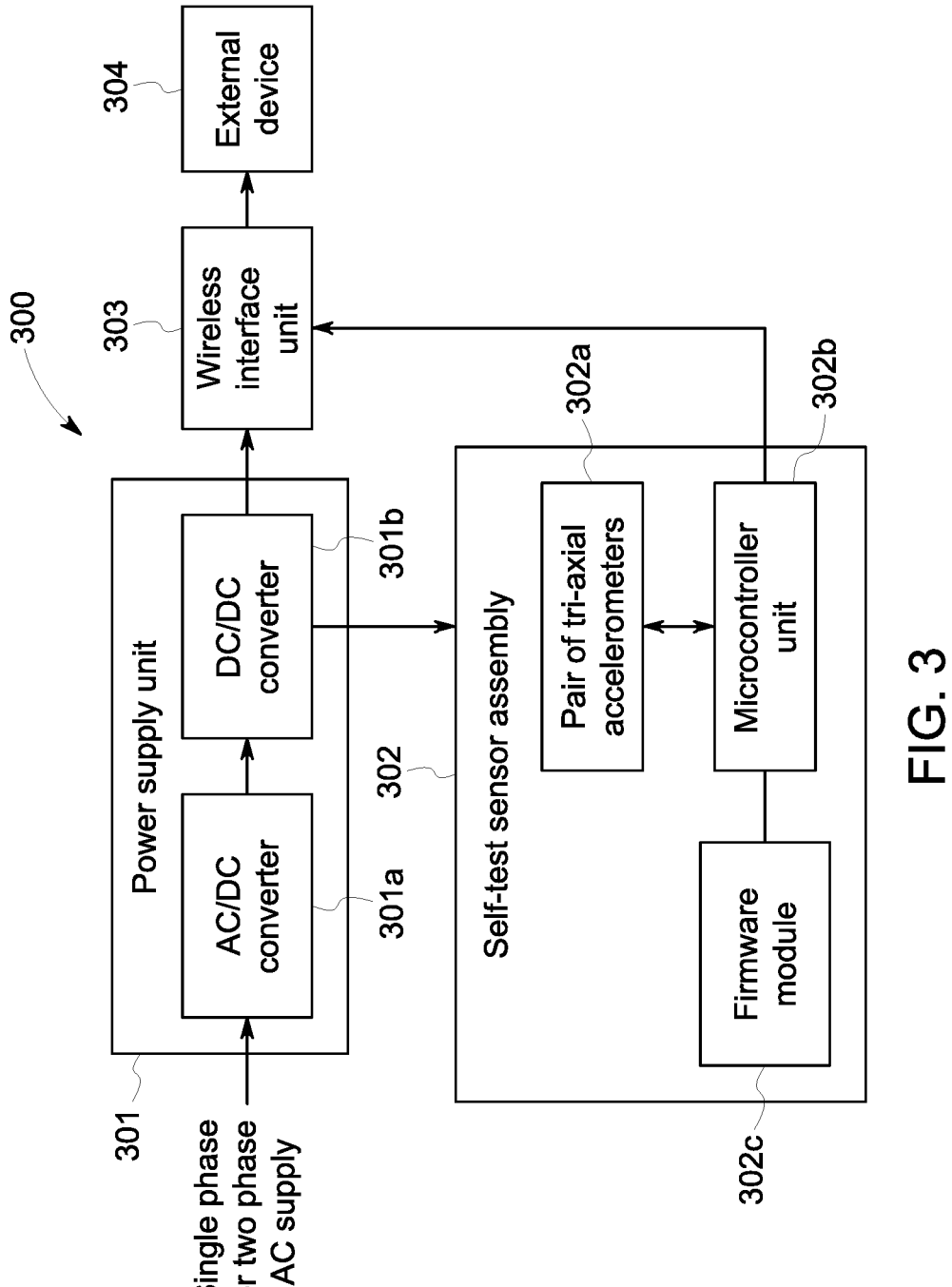
FIG. 3 depicts a block diagram representation of a system for self-precision validation accelerometer sensor, in accordance with an exemplary embodiment of the invention.

In another exemplary embodiment of the invention, FIG. 3 shows a block diagram representation of a system 300 for self-precision validation accelerometer sensor. The system 300 comprises a power supply unit 301, a self-test sensor assembly 302, a wireless interface unit 303, and an external device 304.

The power supply unit 301 includes an AC/DC converter 301*a* and a DC/DC converter 301*b* that receive single phase or two phase AC power supply, convert and supply power to the self-test sensor assembly 302 and the wireless interface unit 303. The pair of tri-axial accelerometers 302*a* interfaces with the microcontroller unit 302*b* and communicates the vibration data in analog form. The firmware module 302*c* is configured within the microcontroller unit 302*b* which processes the vibration readings, initiates the accelerometers to conduct in built self-test, generates a self-test report and provides an output signal which is further transmitted to an external device 304 of the user via the wireless interface unit 303 i.e., WiFi or bluetooth. The system 300 further utilizes RC filters to process the analog vibration data for limiting the bandwidth.

Figure 4A:
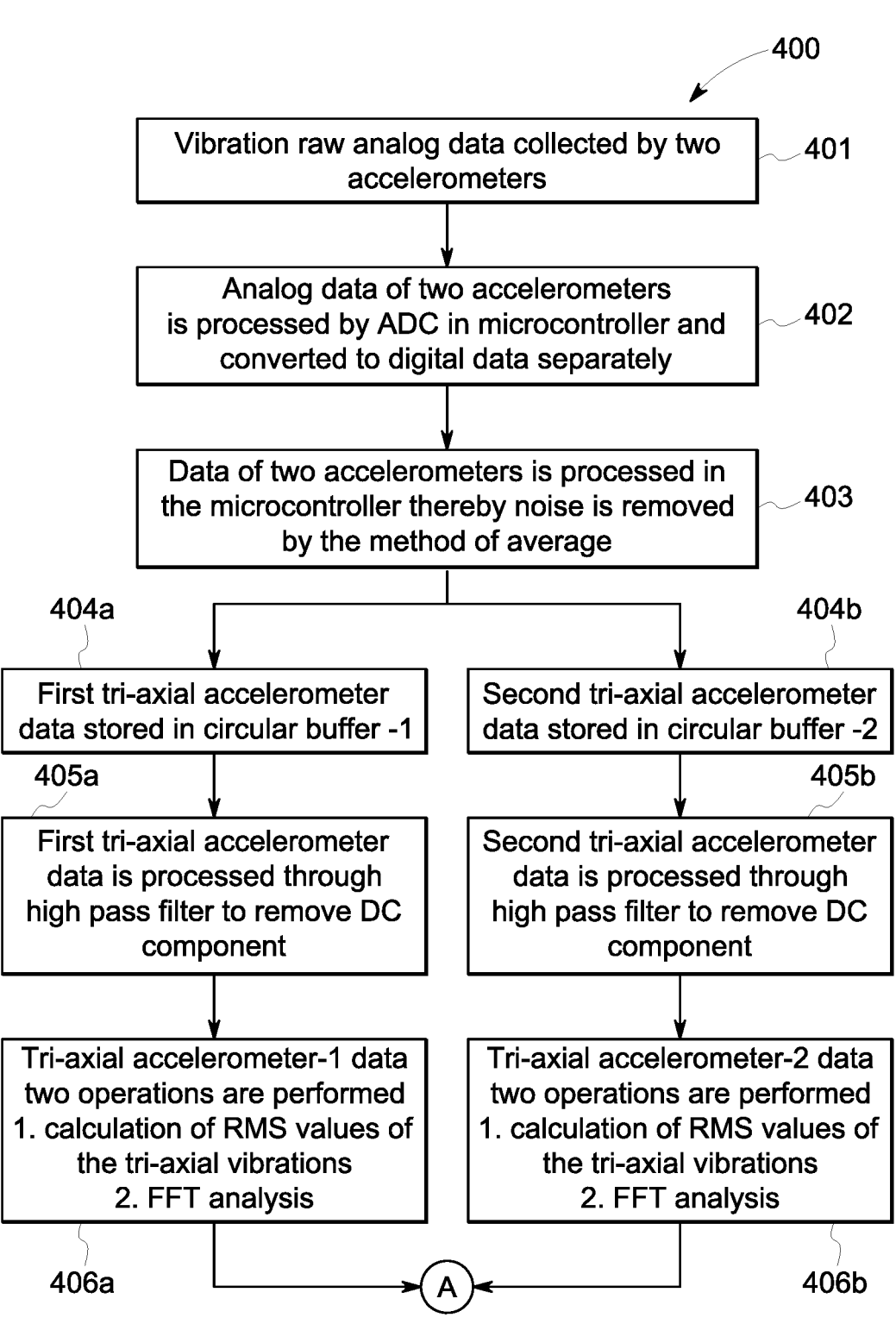
FIGS. 4a and 4b illustrate flowcharts of a self-precision validation test procedure procedure performed by the firmware module, in accordance with an exemplary embodiment of the invention.
Figure 4B:
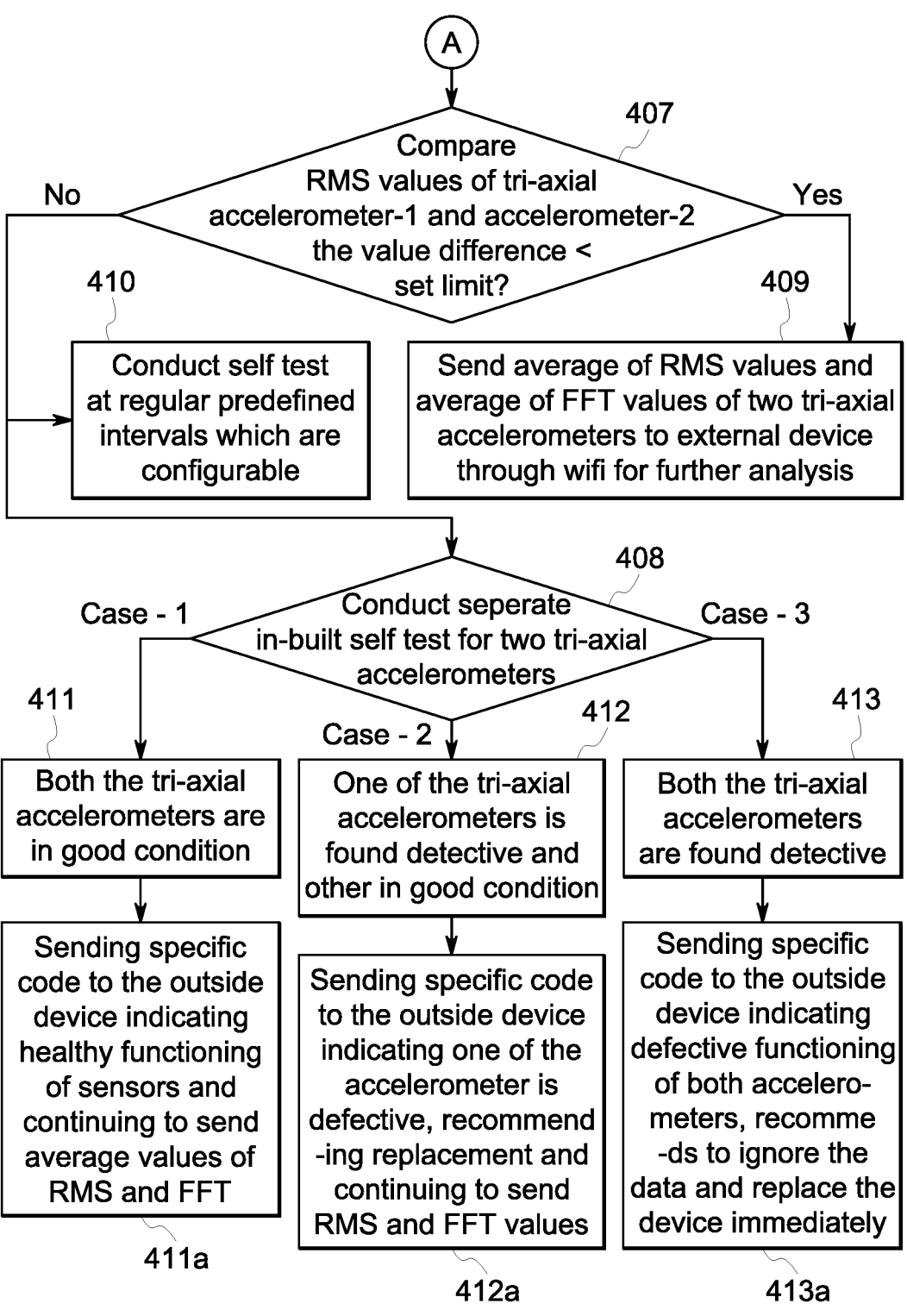

In another exemplary embodiment of the invention, FIGS. 4*a* and 4*b* illustrate flowcharts of a self-precision validation test procedure 400 of the two tri-axial accelerometers carried out by the firmware module. The method 400 comprises the steps of collecting raw analog vibration data by the two tri-axial accelerometers at step 401. At step 402, the analog vibration data from the two tri-axial accelerometers is processed converted into digital data by ADC in the microcontroller unit. At step 403, the converted digital data of the two accelerometers is processed in the microcontroller unit to thereby remove the noise using a method of average.

At steps 404a and 404b, data of the first tri-axial accelerometer and data of the second tri-axial accelerometer are stored separately in the first and second circular buffers. At steps 405a and 405b, the stored data of the first tri-axial accelerometer and the second tri-axial accelerometer is then processed through high pass filters separately to remove DC component. Next, at steps 406a and 406b, calculation of RMS values and FFT values is carried out separately for each processed data of vibrations of the first tri-axial accelerometer and the second tri-axial accelerometer.

Later at step 407, the RMS value of the first tri-axial accelerometer is compared with the RMS value of the second tri-axial accelerometer and then a difference value is obtained. Then, the obtained difference value is verified with the pre-determined set limit. If the obtained difference value is greater than the predetermined set limit, then the firmware module triggers the accelerometers to conduct in built self-test separately for two tri-axial accelerometers at step 408. If the obtained difference value is less than the predetermined set limit, then the average of RMS values and average of FFT values of the first and second tri-axial accelerometers are sent to the external device through Wi-Fi for further analysis at step 409. The self-test is also configured to be conducted at regular predefined intervals which are configurable say either at 1 hour, 2 hour etc. as depicted at step 410.

Once the self-test is completed, three following cases are raised. At step 411, case 1 is resulted where both the tri-axial accelerometers are found in good condition. The firmware module therefore sends a specific code to the outside device indicating healthy functioning of the sensors and continues to send average of RMS values and average of FFT values of the two Tri-axial accelerometers to external device through WiFi for further analysis at step 411a. Thus, in this case the normal procedure of processing and posting of data continues.

At step 412, case 2 is resulted where one of the tri-axial accelerometers is found defective and the other is in good condition. The firmware module therefore sends a specific code to the outside device indicating one of the tri-axial accelerometers is defective and recommending replacement of the device at the next available opportunity at step 412a. The firmware module in this step ignores the data collected from defective sensor and continues to send RMS values and FFT values collected without taking average from the second healthy tri-axial accelerometer to the external device through WiFi for further analysis.

Finally, at step 413, case 3 is resulted where both the tri-axial accelerometers are found defective. The firmware module therefore sends a specific code to the outside device indicating defective functioning of both the tri-axial accelerometers at step 413a. In this case, the firmware module recommends to ignore the data from both the sensors and replace the device immediately.

The in built self-test procedure of the accelerometer comprises the steps of sending self-test enable command from the microcontroller to the tri-axial accelerometer. The microcontroller will read predefined vibration data samples (say 1000 samples) of all the three axis in terms of voltage and store the average voltage value of 1000 samples of all the three axis individually.

Next, the microcontroller sends a of self-test disable command to the tri-axial accelerometer. The microcontroller will read predefined vibration data samples (say 1000 samples) of all the three axis in terms of voltage and store the average voltage value of 1000 samples of all the three axis individually.

The difference of the average voltage values of all the three axis collected and stored during the self-test enable command and the self-test disable command is calculated. The calculated difference value is compared with accelerometer predefined self-test values. The accelerometer is confirmed as faulty if any one of the axis voltage difference value is not matched with original value or else confirming the accelerometer is healthy.

Numerous advantages of the present disclosure may be apparent from the discussion above. In accordance with the present disclosure, an automated self-precision validation accelerometer sensor device provides precise vibration readings for detecting defects in rotating or reciprocating machines. The usage of two tri-axial accelerometers instead of one provides more accurate and reliable data acquisition that allows identifying ill-health or malfunctioning of tri-axial accelerometers and validating the accelerometers health by conducting in built self-test as and when required.

Instead of collecting data by one tri-axial accelerometer, the data is being collected simultaneously from the two tri-axial accelerometers and average of the two is taken. This would minimize the possibility of any minute error since there may be a minute difference in the readings of the two sensors. This brings the data nearer to the actual value hence makes it more accurate and reliable.

The self-precision validation test procedure triggers the accelerometer to conduct in built self-test as and when required. The self-test of the tri-axial accelerometer sensor is conducted either at predefined regular intervals or whenever the difference in the RMS values calculated by using the data from the pair of tri-axial accelerometers is more than a minimum allowable percentage. The design of the tri-axial accelerometer sensor therefore provides an accurate, error-free, efficient and reliable vibration data.

The automated self-precision validation test with the help of the firmware module sends notifications wirelessly to the external device for further action to be taken whenever tri-axial accelerometers are not in good condition. The sensor system is need not be required to change immediately even when health of one of the tri-axial accelerometer is found not good in the in built self-test. The system ensures that the data from the other healthy tri-axial accelerometer alone is collected and forwarded directly for further processing, ignoring the data from the faulty tri-axial accelerometer and hence without finding average of the two.

Moreover, the proposed sensor assembly with two magnets arrangement provides a closed magnet circuit for better fixing of the sensor assembly to the metallic cup holder. The usage of the metal plate and the metallic cup holder restricts total magnetic field produced by the two magnets from influencing all sensitive electronic components of the sensor housing. The sensor assembly in other variant can utilize other materials and components compared to the metal plate and metallic cup holder to thereby restrict the total magnetic field produced by the two magnets.

Predefined set values are set up in the algorithm of the firmware module either at product manufacture level or at the installation level by the user. The values are allowed to be modified at any stage by the user using any external device. Further, specific codes that are sent by the microcontroller to the external device can also be set either at the manufacture level or at the installation level or can be modified at any stage by the user.

It will readily be apparent that numerous modifications and alterations can be made to the processes described in the foregoing examples without departing from the principles underlying the invention, and all such modifications and alterations are intended to be embraced by this application.

I claim:

1. An automated system for self-precision validation accelerometer sensor, comprising:

a self-test sensor assembly configured for accommodating various components to conduct self-precision valida-tion test and machine diagnosis, and wherein said components further comprising:

a pair of tri-axial accelerometers configured to detect vibration data from the machine and conduct an in built self-test, a microcontroller board accommodated with said pair of tri-axial accelerometers and configured with a firmware module that automatically conducts a self-precision validation test of the accelerometers by initiating the in built self-test in the two tri-axial accelerometers at specific constraints, generates a self-test report and thereby transmits an output signal on health status of the accelerometers based on the report, an acrylic sheet arranged to hold said microcontroller board, a pair of magnets arranged with their poles in reverse for fixing of the sensor assembly, a sensor casing configured to accommodate said pair of magnets and said microcontroller board along with a metal plate behind the pair of magnets, a metallic cup holder configured for holding said sensor casing on the machine or any vibrating surface and forming a closed magnet circuit along with said metal plate behind said pair of magnets for fixing of the sensor assembly and safeguarding the electronic components from getting influenced by the magnetic field, and a wireless interface unit configured to transmit said output signal from the microcontroller to an external device for further analysis;

whereby said automated system with said self-precision validation test identifies ill-health or malfunctioning of the sensor device as and when required.

2. The automated system for self-precision validation accelerometer sensor as recited in claim 1, wherein said sensor casing is affixed with a rubber gland to route cables which holds power and communication wires.

3. The automated system for self-precision validation accelerometer sensor as recited in claim 1, wherein said arrangement of reversing the polarity of said pair of mag-nets, usage of said metal plate and said metallic cup holder restricts total magnetic field provided by the two magnets from influencing all sensitive electronic components of the sensor assembly.

4. The automated system for self-precision validation accelerometer sensor as recited in claim 1, wherein said metallic cup holder is attached on the machine or any vibrating surface with the help of either glue or welding to prevent the sensor assembly from sliding.

5. The automated system for self-precision validation accelerometer sensor as recited in claim 1, wherein said specific constraints considered by the firmware module to initiate the in built self-test include regular predefined inter-vals and whenever the difference in the RMS values from the two accelerometers is more than a minimum allowable percentage.

6. The automated system for self-precision validation accelerometer sensor as recited in claim 5, wherein said regular predefined intervals say once in 60 minutes, and wherein the minimum allowable percentage, say 10%.

7. The automated system for self-precision validation accelerometer sensor as recited in claim 1, wherein said output signal from the microcontroller includes specific codes provided by the firmware module which further include healthy status of the tri-axial accelerometers and suggestion to replace the defective sensor.

8. The automated system for self-precision validation accelerometer sensor as recited in claim 1, wherein said system further comprises a power supply unit that includes an AC/DC converter and a DC/DC converter.

9. The automated system for self-precision validation accelerometer sensor as recited in claim 1, wherein said system utilizes RC filters to process the analog vibration data for limiting the bandwidth.

10. A method for self-precision validation of tri-axial accelerometers, comprising:

collecting and processing vibration data from a first tri-axial accelerometer and a second triaxial acceler-ometer;

calculating an RMS value and an FFT value for each accelerometer from the processed vibration data;

calculating a difference value from the RMS values of the first tri-axial accelerometer and the second tri-axial accelerometer;

calculating an average of RMS values and an average of FFT values of the two tri-axial accelerometers if the calculated RMS difference value is less than a set limit;

sending the average values of RMS and FFT analysis of the two tri-axial accelerometers to an external device through a wireless interface for further analysis;

initiating the two tri-axial accelerometers to conduct in built self-test either at regular predefined intervals or if the calculated RMS difference value of the first tri-axial accelerometer and the second tri-axial accelerometer is greater than the set limit;

generating a self-test report;

sending indication of health status of the accelerometers to the external device if both the tri-axial accelerom-eters are in good condition and continuing to send the average values of RMS and FFT analysis;

sending indication of defective accelerometer to the exter-nal device and recommendation to replace if one of the tri-axial accelerometer is found defective and other in good condition and thereby continuing to send RMS value and FFT value collected from the healthy tri-axial accelerometer; and sending indication of defective functioning of both the accelerometers to the external device if both the tri-axial accelerometers are found defective and recom-mending to replace the accelerometers immediately.

* * * * *